United States Patent

Reinhart et al.

[15] 3,697,202
[45] Oct. 10, 1972

[54] SIDE SEAL FOR ROTARY COMBUSTION ENGINE

[72] Inventors: Henry F. Reinhart, Utica; Robert L. Dega, Mt. Clemens, both of Mich.

[73] Assignee: General Motors Corporation, Detroit, Mich.

[22] Filed: April 7, 1971

[21] Appl. No.: 131,891

[52] U.S. Cl. ............................................. 418/142
[51] Int. Cl. ......... F01c 19/00, F03c 3/00, F04c 27/00
[58] Field of Search ........ 418/140, 142, 144; 277/96, 277/134

[56] References Cited

UNITED STATES PATENTS

| | | | |
|---|---|---|---|
| 1,720,696 | 7/1929 | Simpson | 277/134 |
| 3,193,188 | 7/1965 | Bentele | 418/142 |
| 3,251,541 | 5/1966 | Paschke | 418/142 |
| 3,300,127 | 1/1967 | Yamamoto et al. | 418/142 |

Primary Examiner—Carlton R. Croyle
Assistant Examiner—John J. Vrablik
Attorney—J. L. Carpenter, E. J. Biskup and Peter D. Sachtjen

[57] ABSTRACT

A side seal for a rotary combustion engine includes an elastomeric biasing ring and an L-shaped sealing annulus which has an axial support sleeve loosely retained within a groove formed in the engine rotor and a radial sealing flange engaging the sidewalls of the engine working chamber. The biasing ring is compressively retained within the groove and serves in conjunction with fluid pressure in the engine crankcase to bias the sealing flange into operative contact with the sidewalls. A spiral groove formed in the sealing flange functions upon planetary motion of the rotor to generate hydrodynamic forces which oppose fluid leakage toward the working chamber. The spiral groove is defined by a multiple turn buttress thread which additionally functions as a helical wiping blade for sweeping the sidewalls during the radial component of rotor movement to mechanically direct the fluid toward the crankcase.

2 Claims, 4 Drawing Figures

PATENTED OCT 10 1972 3,697,202

INVENTORS
Henry F. Reinhart &
BY Robert L. Dega

Peter D. Sachtjen
ATTORNEY

SIDE SEAL FOR ROTARY COMBUSTION ENGINE

The present invention relates to seals for rotary combustion engines and, in particular, to fluid seals for the sidewalls of a rotary combustion engine working chamber that includes hydrodynamic pumping means for preventing the interchange of fluid between the engine working space and the engine crankcase.

One form of a rotary combustion engine comprises a housing having an epitrochoidal cavity in which a rotor or piston is journaled on an eccentric portion of a shaft. The rotor engages the peripheral wall of the cavity to establish a plurality of working chambers which constantly vary in volume during the planetary or orbital motion of the rotor. In order to prevent the outward flow of lubricating oil from the crankcase and the inward flow of combustion cases from the working chambers, various gas and fluid seals have been proposed for the space between the sidewalls of the cavity and the rotor. The gas seal is normally carried at the periphery of the rotor and seals the high pressure gas to limit the pressure on an inwardly spaced fluid seal which acts as a primary barrier to the flow of fluid from the crankcase. Typically, the fluid seal comprises an annular metallic strip which is retained within a groove formed in the side faces of the rotor and spring biased into operative engagement with the sidewalls of the working chamber.

This arrangement, however, has not proven to be satisfactory inasmuch as the thermal and pressure variations encountered during engine operation cause distortion of the mating metallic sealing surfaces of the seal and the sidewalls. The distortion creates minute gaps through which engine gases and crankcase fluids can bidirectionally flow. The effects of heat and pressure are further magnified by the aforementioned orbital motion of the rotor which, in addition to rotating movement, causes the seal to experience a radial wiping motion. This compound movement increases the adverse effects of distortion and makes the current side seals unreliable for extended usage.

The present invention contemplates a side seal for a rotary combustion engine that is freely conformable with its mating surface in a manner which limits the above-mentioned sealing problems occasioned by heat and pressure. Additionally, the subject seal incorporates hydrodynamic and mechanical means which maintain oil in the crankcase despite the compound rotary and radial movement of the rotor. More particularly, the side seal comprises an L-shaped sealing annulus having an axial support sleeve loosely received within a cylindrical groove in the rotor and resiliently retained therein by a peripheral bead received in an undercut portion of the groove. By loosely fitting the sealing annulus in the groove and retaining it only at its rearward extremity, the annulus is able to freely flex into conformity with a mating surface of the sidewall during orbital movement and despite the thermal and pressure variations encountered during engine operation. The support sleeve frontly terminates at a radially inwardly turned sealing flange which operatively engages the sidewalls. An elastomeric biasing ring compressively retained within the groove beneath the sealing annulus serves to outwardly urge the sealing flange into operative sealing engagement with the sidewalls and, in conjunction with fluid pressure in the crankcase, into continuous conformity therewith during all phases of rotor movement.

The sealing surface of the flange is provided with a spiral groove defined by a multiple turn buttress thread that generates hydrodynamic forces to repel fluid leaking along the sealing interface. The crests of the buttress threads act as helical wiping blades which mechanically sweep the sidewalls during planetary movement of the rotor to return migrating fluid toward the crankcase. With the above arrangement, adequate sealing pressure and surface conformity is assured independent of rotor movement or environmental temperature and pressure conditions.

These and other features will be apparent to one skilled in the art upon reading the following detailed description, reference being made to the accompanying drawings in which.

Figure 1:
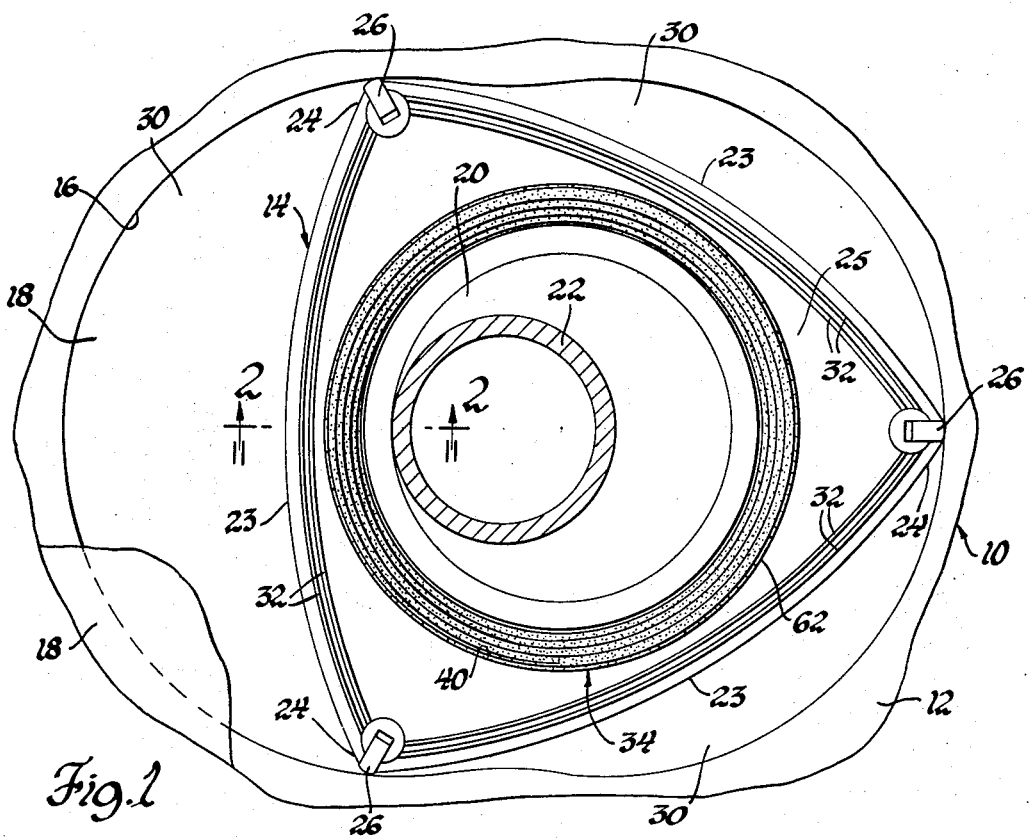
FIG. 1 is a sectional view of a rotary combustion engine incorporating a rotor side seal made in accordance with the present invention.
Figure 2:
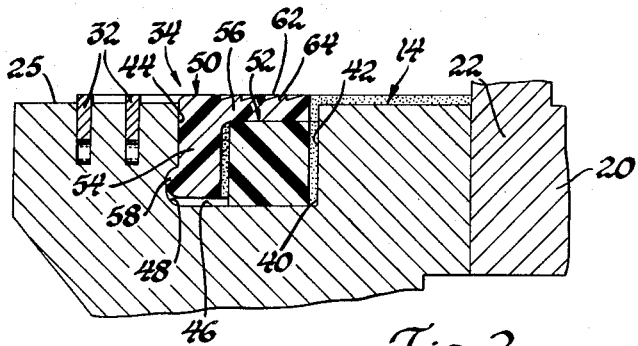
FIG. 2 is an enlarged sectional view taken along line 2—2 of FIG. 1.
Figure 4:
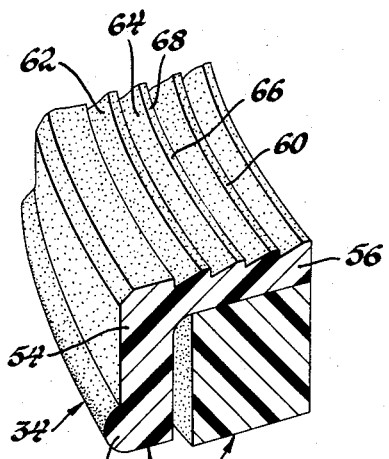
FIG. 4 is an enlarged perspective view of the rotor side seal.
Figure 3:
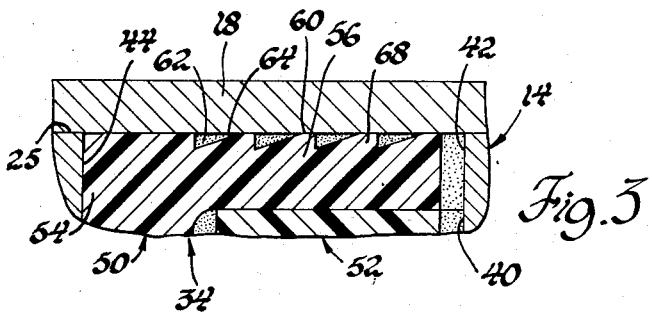
FIG. 3 is an enlarged view of the sealing interface between the sidewalls and the sealing flange.

Referring to FIG. 1, there is shown a rotary combustion engine 10 comprising a housing 12 and a rotor 14. The housing 12 includes a two-lobed epitrochoidal cavity defined by an interior peripheral wall 16 bounded by axially spaced sidewalls 18. The rotor 14 is disposed within the cavity and rotatably carried by an eccentric 20 of a shaft 22. The rotor 14 is generally triangular in shape having arcuate sides 23 defining apex portions 24 and planar end faces 25. A sealing strip 26 is disposed within a slot at each apex 24 and spring biased into engagement with the peripheral wall 16 to axially seal the cavity. The rotor 14 thus establishes a plurality of working chambers 30 which vary in volume upon planetary movement of the rotor 14 in the housing 12. The shaft 22 is journaled within bearings (not shown) on the sidewalls 18 and upon rotation thereof the rotor 14 rotates at one-third the speed of the shaft 22 and thereby eccentrically moves with an orbiting or planetary movement to continuously sweep the sidewalls 18 of the cavity. By conventional means, an ignitable mixture is introduced into a working chamber and ignited therein to drive the rotor 14 in a path as controlled by the eccentric 20, the exhaust gases being vented by appropriate porting.

The space between each sidewall 18 and each end face 25 is sealed by a two-piece assembly including a pair of gas sealing strips 32 and a fluid side seal 34. The sealing strips 32 are conventional metallic strips and arcuately extend between the adjacent apexes 24. The strips 32 are retained within grooves formed in the end faces 25 and spring biased into engagement with the sidewalls 18 to establish a primary barrier to leakage of the products of combustion and minimize the pressure differential on the fluid side seal 34.

The fluid side seal 34 is received and retained within the confines of a U-shaped annular groove 40 formed in the end face 25 of the rotor 14. The groove 40 is defined by an inner wall 42 disposed adjacent the eccentric 22 and a radially outwardly spaced outer wall 44, the walls 42 and 44 being interconnected at an annular base wall 46. A circumferential undercut notch 48 is formed in the outer wall 44 adjacent the base wall 46.

More particularly, the side seal 34 comprises a generally L-shaped primary sealing annulus 50 and a rectangular biasing ring 52. The sealing annulus 50 is formed of a low friction plastic material and comprises a cylindrical axial support sleeve 54 which forwardly terminates at a radially inwardly extending sealing flange 56. An outwardly projecting peripheral bead 58 is formed at the rearward corner of the support sleeve 54. The outer surface of the support sleeve 54 has a diametral clearance with respect to the outer wall 44 of the groove 40 and is limitedly radially shiftable therewithin being restrained only by the operative engagement between the bead 58 and the notch 48. In this manner, the permissible flexing and shifting of the sealing annulus 50 permits the sealing flange 56 to establish a continuous operative engagement with the sidewalls 18 despite thermal and pressure variations in the engine.

The biasing ring 52 is formed of a resilient elastomeric material and has a thickness greater than the space between the sealing flange 56 and the base wall 46 so as to be compressively retained therebetween. This causes an outward biasing or flexing of the flange 56 about the support sleeve 54 into conformity with the sidewalls 18, the only restraint being the aforementioned engagement between the bead 58 and the notch 48. Additionally, the pressure of the fluid within the groove 40 between the biasing ring 52 and the inner wall 42 will radially compress the biasing ring 52 and increase the engagement pressure between sealing flange 56 and the sidewalls 18. The aforementioned biasing will affirmatively maintain the sealing flange 56 in operative sealing engagement despite thermal or pressure variations and despite the orbital movement of the rotor 14.

The sealing capabilities of the subject side seal 34 are further enhanced by a hydrodynamic groove 62 formed in the sealing surface 60. The hydrodynamic groove 62 defines an archimedal spiral lip having approximately four helical turns as defined by a helically wrapped buttress thread 64. The crests 66 of the buttress thread establish a plurality of wiping blades 68 when viewed in a radial cross section. The hydrodynamic groove 62 is helically inclined in the direction of prevailing rotary rotation between the rotor 14 and the housing 12 to thereby generate viscous shear forces in accordance with rotor speed and effect a pumping action to return leaking fluid to the engine crankcase. Additionally, the wiping blades 68 are effective during the radial component of the rotor movement to scrape the surfaces and mechanically return, in combination with the pumping forces, leaking fluid to the crankcase.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A seal for a rotary combustion engine having a rotor member supported in a housing for compound rotary and radial motion with respect to a sidewall member, comprising: a seal element received within a groove formed in one of the members and having a continuous planar sealing surface engageable with a mating surface of said other of said members, said seal element being flexibly retained in said groove for permitting continuous conforming to said mating surface independent of thermal and pressure conditions in the engine; resilient means compressively retained in said groove for biasing said sealing surface into operative sealing engagement with said mating surface; and a multiple thread groove formed in said sealing surface defined by a spiral lip, the surfaces of said lip generating viscous shear forces during rotary motion of the rotor member and acting as wiping blades during radial motion of the rotor member for returning leaking fluid to the crankcase.

2. In a rotary combustion engine having a rotor eccentrically rotatable within a cavity so as to establish a plurality of variable volume working chambers, said cavity being defined by axially spaced sidewalls and said rotor having an annular groove formed in an axially facing surface thereof adjacent the sidewalls that terminates in an annular undercut notch, a side seal for preventing the flow of fluid from the engine crankcase to the working chambers, comprising: a flexible sealing annulus receivable within the confines of the groove, said sealing annulus being L-shaped in cross section and including an annular radial sealing flange and a cylindrical axial support sleeve, the latter of which has a clearance with an inner portion of the groove to permit limited radial movement of the sealing annulus; an outwardly projecting circumferential bead formed on the support sleeve and located in the notch for axially retaining the sealing annulus on the rotor while accommodating limited flexure of said sealing flange into continuous sealing conformity with the sidewalls thereby minimizing surface distortions in the sealing surface due to thermal and pressure variations in the engine; an elastomeric biasing ring of rectangular cross section compressively retained between the base of the groove and the sealing flange, said biasing ring serving in conjunction with fluid pressure to urge said sealing flange into operative engagement with the sidewalls; and a spiral groove formed in said sealing flange and defined by a multiple thread helical lip, the spiral groove having portions thereof generating hydrodynamic forces during rotary movement of the rotor to repel leakage and the lip mechanically wiping the sidewalls during radial movement of the rotor to direct leaking fluid toward the crankcase.

* * * * *